Feb. 26, 1924.
G. T. RANDLE
1,484,962
PROTECTION FOR ELECTRIC MOTORS
Filed Oct. 7, 1919     2 Sheets-Sheet 1
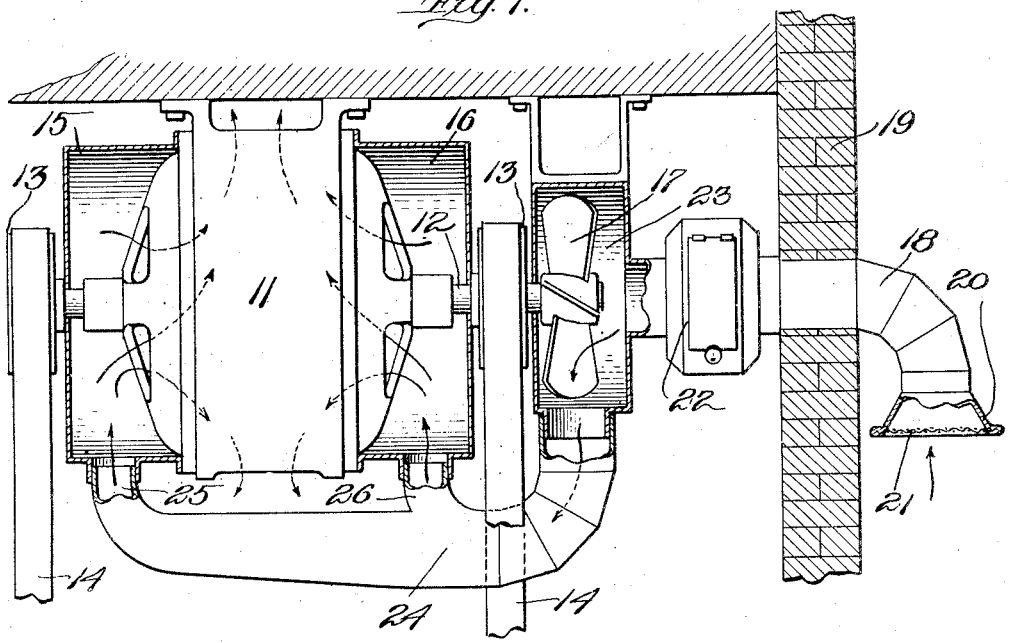
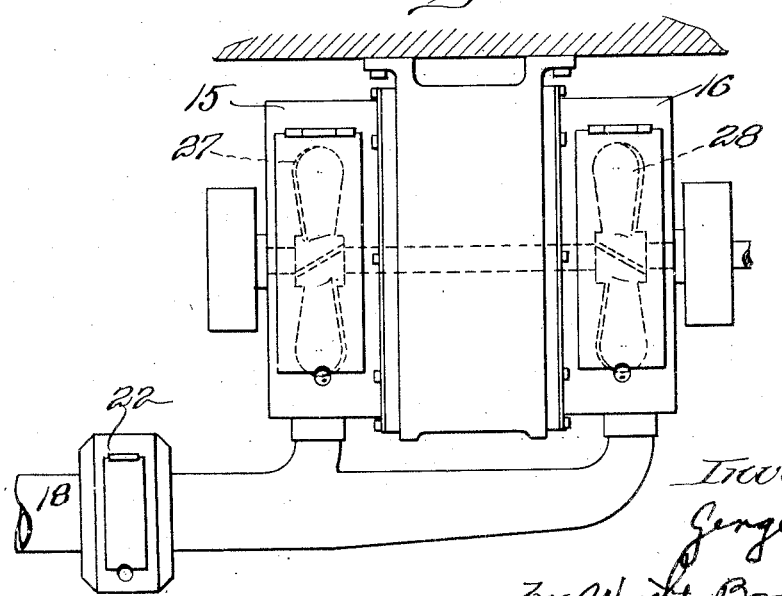

Feb. 26, 1924.
G. T. RANDLE
PROTECTION FOR ELECTRIC MOTORS
Filed Oct. 7, 1919
1,484,962
2 Sheets-Sheet 2
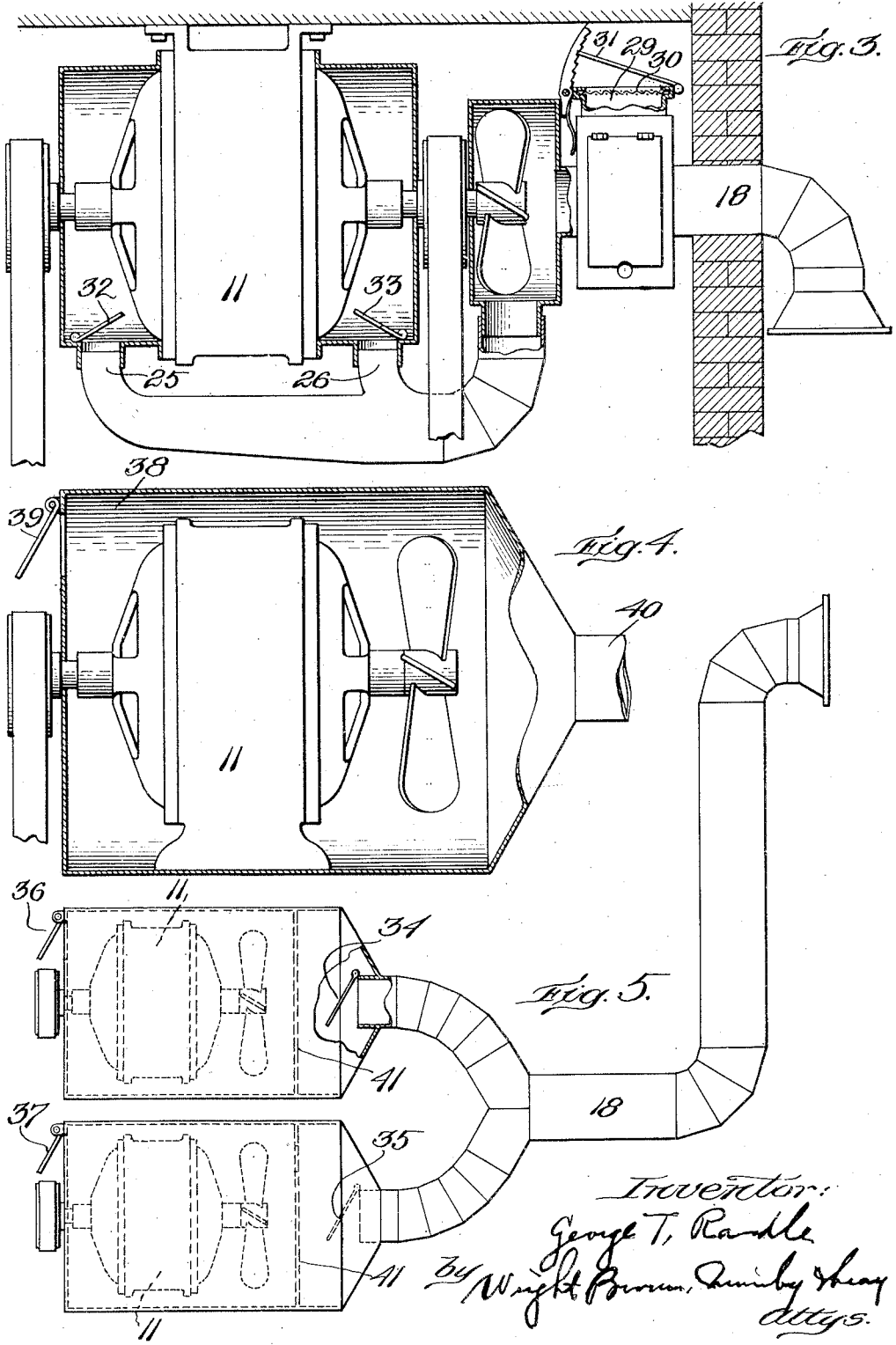

Patented Feb. 26, 1924.

1,484,962

UNITED STATES PATENT OFFICE.

GEORGE THOMAS RANDLE, OF SAYLESVILLE, RHODE ISLAND, ASSIGNOR TO MOTOR PROTECTION COMPANY, OF PAWTUCKET, RHODE ISLAND, A CORPORATION OF RHODE ISLAND.

PROTECTION FOR ELECTRIC MOTORS.

Application filed October 7, 1919. Serial No. 329,114.

*To all whom it may concern:*

Be it known that I, GEORGE T. RANDLE, a citizen of the United States, residing at Saylesville, in the county of Providence and State of Rhode Island, have invented new and useful Improvements in Protections for Electric Motors, of which the following is a specification.

The subject-matter to which this present invention relates is that of means for protecting and cooling electric motors, particularly such as are used in manufacturing establishments for driving machines which carry on industrial processes.

The air in shops and factories is frequently more or less laden with moisture, dust, lint, etc. (this is especially true in cotton factories), while an electric motor becomes heated in running, and in many factories the motors used for the purposes indicated are suspended from the ceiling, where the room atmosphere is at such a high temperature that ordinary conduction is ineffective for cooling. Protection from overheating and from matter suspended in the air of the room is given by a protective casing which excludes the surrounding air from contact with the motor, and by the combination with such a casing, of a means for delivering a current of air from outside of the building or apartment in which the motor is contained, and directing such air current through the motor in a manner to take up and carry away heat generated by running of the motor. A system of cooling and protecting motors, already in use, is illustrated in the patent of John William Nolan, 1,175,977, dated March 21, 1916.

The purposes of the present invention are to provide a more effective supply and circulation of air to and through the motor than has been previously accomplished; to provide for regulation of the temperature by addition of properly screened warm air into the protective casing of the motor; and to prevent possibility of the external air connections acting to draw air from within the apartment through the motor and out of the building. All of these objects and purposes are adapted to be accomplished by means combined in a single installation, or certain of them may be independently realized in different installations.

I have shown in the drawings furnished with this specification different forms of motor protection apparatus or means embodying the above mentioned features of the invention, both separately and in combination one with another.

In said drawings:

Figure 1 is a vertical section, showing in elevation an electric motor and protection means embodying certain features of the present invention applied thereto, said protection means being partly in section.

Figure 2 is an elevation showing a modification in the mode of applying the protection means.

Figure 3 is a view similar to Figure 1, illustrating the combination of a number of features for which I claim protection, in the same apparatus.

Figure 4 is a view of a motor with a completely enclosing casing having a valve-protected outlet.

Figure 5 is a diagrammatic view, illustrating the means for stopping the back draft, as applied to a gang of motors.

Like reference characters indicate the same parts in all of the figures.

Referring now to Figure 1, 11 represents an electric motor, shown as being suspended from a ceiling or other support above the floor of the shop or room in which it is installed. This motor is conventionally shown in elevation, and typifies any sort of electric motor. The drawing also illustrates the fact that the casing of the motor has openings in its ends and in other parts of its frame, through which it is possible for air to enter and issue, arrows being applied to represent the courses in which air for cooling purposes may be caused to flow. 12 represents the armature shaft, and 13, 13 represent pulleys from which power is delivered to belts 14, 14 for driving machines or for other purposes.

Now, in order to protect the motor from dust, moisture, etc., in the air of the room, I provide casings 15 and 16, which are shaped and arranged to enclose the ends of the motor, and are secured to the central frame thereof in a sufficiently tight manner to exclude the ordinary circulation of air. These casings are wholly between the motor and the pulleys, and have openings through which the armature shaft passes.

For cooling the motor, I provide a conduit for air, which passes from outside the building to the casings, and arrange a fan 17 in a part of the conduit, such fan being mounted on the armature shaft. The conduit comprises the entrance section 18, which passes through the wall 19 of the building, and has a bell mouth 20, equipped with a strainer 21; a dust collector 22, which may be either outside or inside of the building, but is preferably inside, into which the section 18 opens; a fan chamber 23, connected with the dust collector by an intermediate section; and a terminal air delivery section 24, which passes from the fan chamber, and is provided with branches 25 and 26 opening into the chambers 15 and 16 respectively. The dust collector may be of any construction, and equipped with any means effective to filter air and dislodge dust and other objectionable matter carried in suspension with the air, and I may use any of several well-known air filters as such dust collector. The fan is conventionally illustrated as of the inclined blade or screw propeller type, but this illustration is not intended as in any wise a limitation of the invention, for I may use any form whatever of fan or blower which is known or may be found to be suitable for the purpose, namely, of propelling a current of air through the conduit.

It will be understood from the foregoing description that, when the motor is in operation, air is drawn from outside of the building, is cleaned of foreign matter, and is then blown through the openings of the motor frame and through the interior laminations and windings of the motor armature and field, two currents of air thus entering simultaneously at opposite ends and being expelled from the middle part of the motor.

In Figure 2 is shown essentially the same arrangement of casings and air delivery from a conduit, applied to a motor of the type in which fans are applied on the ends of the rotor, and in this figure the motor and the protective casings are shown in elevation, but the fans are illustrated conventionally by dotted lines at 27 and 28. In this case, the conduit runs from the entrance end to the delivery end without including any fan casing such as that previously described. A dust collector or filter is, however, indicated at 22.

It sometimes happens that, when out-of-door air is supplied to motor-protective casings of the sort herein referred to in very cold weather, the low temperature of the air confined in the casing causes condensation of moisture from the surrounding air of the apartment, particularly in places such as cotton mills where the air in the apartment has high humidity. In order to prevent such effect of condensation, or sweating, from taking place, I have provided, in connection with the protection system, a provision for raising the temperature of the incoming air by allowing air from the apartment to flow into the conduit. One possible way of doing this is shown in Figure 3, in connection with an installation of the design shown in Figure 1; and here there is shown an opening 29 into one side of the dust collector, which is protected by a screen 30 and by a damper or valve 31. The latter is adapted to be wholly closed, or to be opened to a greater or less extent, whereby to regulate the proportion of warm air admitted from within the building to the conduit. The location of the opening 29, which, by the way, I may call for convenience the auxiliary inlet or warm air inlet, may be in any part of the conduit between the wall of the building and the fan or blower, but it is preferably at a point where the air entering through it must first pass through the filter or dust collector before being blown into the motor casing. Having this fact in mind, it will be understood that no limiting effect on the protection of the feature of the invention thus particularly described is to be implied from the illustration of Figure 3.

An objectionable effect, which happens at times when the motor is not running, is that the conduit leading out of doors sometimes acts as a chimney to withdraw warm air from the room through the motor. This action carries the dust or moisture laden air through the very parts of the motor from which it is particularly desirable that foreign matter be excluded; and, in order to prevent that, I provide check valves 32 and 33, illustratively represented in Figure 3 as clapper valves or dampers, pivoted over the outlets from the conduit delivery branches 25 and 26. Evidently these check valves are adapted to close whenever there is no current of air flowing into the motor from the conduit, and a back draft tends to close them more tightly.

The same objectionable effect of back draft may take place where a gang or battery of motors are coupled by the branches to the same intake conduit, as shown illustratively in Figure 5, and in this case the running of one or more motors of the gang while other motors stand idle may have the effect of causing a back draft through the casings of the idle motors. The provision of check valves 34, 35, etc., on the delivery branches from the conduit to the several motors effectively prevents such back draft. An alternative and equivalent mode of procuring the same effect is to provide dampers or valves, as illustratively shown at 36 and 37 in Figure 5, over the outlets from the protective casings for the several motors.

Figure 4 shows the invention embodied in the check valve or damper, to prevent back draft, as applied to a totally enclosed type of motor, that is, to one of which the protective casing 38 entirely surrounds and encloses the motor and its fan. Here the check damper is shown at 39, in conjunction with an opening in the rear end wall of the casing. The conduit enters the casing at 40, and air is blown therefrom through and around the motor to the outlet.

A further feature shown in Figure 5 is the type of casing having a flat back, and having, also, a baffle plate between the conduit discharge opening and the fan. A baffle plate is indicated in each instance, as shown in Figure 5, by the numeral 41, and it is made as a plate or partition crossing the casing, but having openings of sufficient area suitably disposed for passage of the cooling air.

The features of the invention thus described in detail may doubtless be widely varied in specific form and arrangement without departing from the essence of the invention as pointed out in the appended claims.

Owing to the various features thus described, I am able to provide effective protection for the motor and for persons liable to come into contact with it; and also to obtain a better and more efficient cooling effect than heretofore; together with means for regulating the temperature of the cooling air and for preventing back draft, as already explained.

What I claim and desire to secure by Letters Patent is:

1. The combination with an electric motor of exterior box-like casings applied to and enclosing the opposite ends of the motor, an armature shaft passing from one of said casings, a fan on said shaft, and a conduit for air having branch pipes connected independently and in parallel to the respective casings, said conduit also enclosing and containing said fan.

2. The combination with an electric motor having an armature shaft and driving pulleys on said shaft adjacent to opposite ends of the motor, of casings fitted to enclose the ends of the motor between such ends and the respectively adjacent pulleys, a fan secured to the armature shaft at the outer side of one of the pulleys, a chamber or casing enclosing said fan, and conduit sections leading to said fan chamber and from said fan chamber respectively, the conduit section which leads from the fan chamber having connections to discharge into the motor casings.

3. The combination with a motor, of protective casings applied over the ends of the motor, a conduit for cooling air leading to said casings, means in said conduit for propelling a stream of air therethrough to the casings, said motor being suspended from the ceiling of a room, and an auxiliary inlet for warm air into the conduit.

4. The combination with a motor and protective casings at the ends thereof, of a conduit leading from outside the apartment in which the motor is installed and connected to deliver air to the casings, said conduit being positioned for the major portion of its length adjacent the ceiling of said apartment, said conduit having provision for admission thereto of warm air from the apartment.

5. The combination with an electric motor of a protective casing, and a conduit arranged to deliver out-of-door air to said casing for cooling the motor, said motor and conduit being positioned in a room and located adjacent the ceiling thereof, the conduit having a warm air inlet arranged to receive heated air from within the building in which the motor is placed.

6. The combination with an electric motor of a protective casing, and a conduit arranged to deliver out-of-door air to said casing for cooling the motor, said motor and conduit being positioned in a room and located adjacent the ceiling thereof, the conduit having a warm air inlet arranged to receive heated air from within the building in which the motor is placed, and a check valve arranged to prevent back draft of air from within the building through the motor and casing to the conduit.

7. An electric motor, and in combination therewith casings enclosing opposite ends thereof, a conduit having branches joined to the casings for delivering air thereto and having also an inlet section leading from the outer air whereby air for cooling is enabled to pass through the motor, a fan driven by the motor for inducing flow of air through the conduit, said motor and conduit being positioned in a room and located adjacent the ceiling thereof, and check valves arranged over the conduit branches and adapted to close and prevent back draft when the motor is idle.

8. The combination with an electric motor, of a protective casing, said motor with its protective casing being supported from the ceiling of an apartment, means for conducting into said casing air from a source outside of said apartment in which the casing is located and at a lower temperature than the apartment, and means for imparting heat to the air so conducted.

9. The combination with an electric motor, of a protective casing, means for conducting into said casing air from a source outside of the apartment in which the casing is located and at a lower temperature than the apartment, and means for heating the air so conducted to a temperature high enough to avoid condensation on the outside of the protective casing of moisture in the atmosphere of said apartment, and said motor being supported from the ceiling of said apartment.

10. In combination, an electric motor having a frame, an armature shaft having its end projected from one end of said frame, a belt pulley on the projecting end of the shaft, a fan on said shaft end positioned at the extreme end portion thereof, a protecting casing for the motor terminating intermediate the end of the frame and the pulley, a fan casing enclosing the fan, a conduit leading to said fan casing, and a connecting conduit bridging the pulley and connecting said fan casing with the protecting casing for the motor.

11. In combination, an electric motor installed in a room and provided with an enclosing casing, a conduit leading from the outer atmosphere, through the side wall of the room, and connecting with said casing, said conduit being positioned adjacent the ceiling in its passage through the room, and said conduit being provided with a side inlet for admitting air from the room, whereby means are provided for preventing condensation on the exterior walls of said conduit.

In testimony whereof I have affixed my signature.

GEORGE THOMAS RANDLE.